(12) United States Patent
Zeng et al.

(10) Patent No.: US 11,930,113 B2
(45) Date of Patent: Mar. 12, 2024

(54) BLOCKCHAIN HYBRID CONSENSUS-BASED SYSTEM FOR MAINTAINING DOMAIN NAME INFORMATION

(71) Applicant: CHINA INTERNET NETWORK INFORMATION CENTER, Beijing (CN)

(72) Inventors: Yu Zeng, Beijing (CN); Hongtao Li, Beijing (CN); Anlei Hu, Beijing (CN); Zhiwei Yan, Beijing (CN); Kejun Dong, Beijing (CN); Douxuan Nan, Beijing (CN)

(73) Assignee: CHINA INTERNET NETWORK INFORMATION CENTER, Beijing (CN)

( * ) Notice: Subject to any disclaimer, the term of this patent is extended or adjusted under 35 U.S.C. 154(b) by 546 days.

(21) Appl. No.: 17/252,672

(22) PCT Filed: Feb. 28, 2019

(86) PCT No.: PCT/CN2019/076455
§ 371 (c)(1),
(2) Date: Dec. 15, 2020

(87) PCT Pub. No.: WO2020/168585
PCT Pub. Date: Aug. 27, 2020

(65) Prior Publication Data
US 2021/0266163 A1 Aug. 26, 2021

(30) Foreign Application Priority Data
Feb. 20, 2019 (CN) .......................... 201910126922.X (51) Int. Cl.
H04L 29/06 (2006.01)
G06F 16/23 (2019.01)
H04L 9/30 (2006.01)
(52) U.S. Cl.
CPC ............ *H04L 9/30* (2013.01); *G06F 16/2315* (2019.01)
(58) Field of Classification Search
CPC ....... H04L 9/30; H04L 9/3247; H04L 9/3297; H04L 9/50; H04L 61/00; H04L 65/40; H04L 9/3239; G06F 16/2315
See application file for complete search history.

(56) References Cited

U.S. PATENT DOCUMENTS

2018/0041345 A1 2/2018 Maim
2018/0337882 A1* 11/2018 Li .......................... H04L 61/35

FOREIGN PATENT DOCUMENTS

| CN | 101543107 A | 9/2009 |
| CN | 106878071 A | 6/2017 |

(Continued)

OTHER PUBLICATIONS

International Search Report dated Nov. 25, 2019 of PCT Application No. PCT/CN2019/076455 in 4 pages.

(Continued)

*Primary Examiner* — Joseph P Hirl
*Assistant Examiner* — Leynna Truvan
(74) *Attorney, Agent, or Firm* — Knobbe, Martens, Olson & Bear, LLP (57) ABSTRACT

Provided in the embodiments of the present application is a blockchain hybrid consensus-based system for maintaining domain name information. A gTLD blockchain is formed by first network nodes where international generic top-level domain registries are located, and a ccTLD blockchain is formed by second network nodes where various countries codes top-level domain registries are located. In each blockchain, various network nodes of the blockchain participate in the domain name information update process, so that the domain name information update process will not be affected by a mistake or an attack on one network node. Compared to centralized maintenance methods, this decentralized maintenance method is more secure and is beneficial to maintaining the stability of the system. International generic domain name information maintenance and country code domain name information maintenance are performed separately, and thus differences in information maintenance between local domain names and generic domain names are adapted and the efficiency of information maintenance is improved. In addition, domain name information is prevented from being maliciously tampered by means of blockchain technology and thus a reliable data source is provided for update of domain names.

8 Claims, 3 Drawing Sheets

(56) References Cited

FOREIGN PATENT DOCUMENTS

| | | |
|---|---|---|
| CN | 107408174 A | 11/2017 |
| CN | 107613041 A | 1/2018 |
| CN | 107895111 A | 4/2018 |
| CN | 108124502 A | 6/2018 |
| CN | 108833603 A | 11/2018 |
| CN | 109327562 A | 2/2019 |

OTHER PUBLICATIONS

Search Report received in Chinese Application No. 201910126922, dated Jan. 9, 2020.

* cited by examiner

BLOCKCHAIN HYBRID CONSENSUS-BASED SYSTEM FOR MAINTAINING DOMAIN NAME INFORMATION

CROSS-REFERENCE TO RELATED APPLICATION

The present application is the U.S. National Phase Application under 35 U.S.C. § 371 of International Application No. PCT/CN2019/076455, filed Feb. 28, 2019, designating the U.S. and published as WO 2020/168585 on Aug. 27, 2020, which claims priority to Chinese Application No. 201910126822.X filed on Feb. 20, 2019, entitled "BLOCKCHAIN HYBRID CONSENSUS-BASED SYSTEM FOR MAINTAINING DOMAIN NAME INFORMATION," which is incorporated herein by reference in its entirety.

FIELD OF TECHNOLOGY

The embodiments of the present application relate to the technical field of domain name information services, and more particularly, to a blockchain hybrid consensus-based system for maintaining domain name information.

BACKGROUND

Domain Name System (DNS) is one of the key infrastructures of the Internet, and the security and stability of the root service system, as the DNS resolution portal, is the prerequisite for the normal and efficient operation of the entire domain name resolution business. However, at present, the domain name root service system is centrally managed and maintained by ICANN and related agencies thereof, which leads to inefficient and inconvenient domain name application, maintenance and use to some extent. In addition, the hierarchical central management mode of the DNS system presents deficiencies in fairness and stability, as well as the most important issue, that is security risks, such as DDoS and DNS cache pollution. Since all data is stored centrally on the central server, it is very likely that the domain name holder or even the entire system will suffer losses due to operational errors or attacks on the domain name information without the assistance or regulation of a second equivalent agency.

In the process of implementing the embodiments of the present application, the inventor has found that in a centralized domain name maintenance method, the normal operation of the entire system will be affected once the server is attacked or operated incorrectly, and the system has low stability and security.

SUMMARY

The technical problem to be solved by the present application is: in a traditional centralized domain name maintenance method, the normal operation of the entire system will be affected once the server is attacked or operated incorrectly, and the stability and security of the system are therefore lower.

In order to solve the technical problem above, the embodiments of the present application provide a blockchain hybrid consensus-based system for maintaining domain name information, including: a gTLD blockchain, formed by first network nodes where international generic top-level domain registries are located; and a ccTLD blockchain, formed by second network nodes where country code top-level domain registries are located;

collecting, by a speaker node in consensus nodes of the gTLD blockchain, domain name operation information from each first network node, packing collected domain name operation information to generate first block information, broadcasting the first block information to member nodes in the consensus nodes, and receiving verification results of various member nodes on the first block information; and sending the first block information to each first network node to execute the domain name operation information in the first block information at each first network node when the number of nodes by which the verification of the first block information passes among the consensus nodes is greater than a first preset threshold;

collecting, by a rotation node which currently takes turn in the ccTLD blockchain, domain name operation information from each second network node, packing collected domain name operation information to generate second block information, broadcasting the second block information to each second network node, and receiving verification results of various second network nodes on the second block information; and sending the second block information to each second network node to execute the domain name operation information in the second block information at each second network node when the number of nodes by which the verification of the second block information passes is greater than a second preset threshold;

wherein, the consensus node is the first network node that participates in the consensus process of verifying block information in the gTLD blockchain, and the consensus node includes the speaker node and the member nodes.

Provided in the embodiments of the present application is a blockchain hybrid consensus-based system for maintaining domain name information. A gTLD blockchain is formed by first network nodes where international generic top-level domain registries are located, and a ccTLD blockchain is formed by second network nodes where various country code top-level domains registries are located. The domain name information of the international generic top-level domain names is maintained by the gTLD blockchain, and the domain name information of various country code top-level domain names is maintained by the ccTLD blockchain. The domain name information of all top-level domain names is maintained by the two blockchains in parallel. In each blockchain, various network nodes of the blockchain participate in the domain name information update process, so that the domain name information update process will not be affected by a mistake or an attack on one network node. Compared to centralized maintenance methods, this decentralized maintenance method is more secure and is beneficial to maintaining the stability of the system. International generic domain name information maintenance and country code domain name information maintenance are performed separately, and thus differences in information maintenance between local domain names and generic domain names are adapted and the efficiency of information maintenance is improved. In addition, domain name information is prevented from being maliciously tampered by means of blockchain technology, and a reliable data source is provided for update of domain names.

BRIEF DESCRIPTION OF THE DRAWINGS

In order to more clearly illustrate the technical solutions in the embodiments of the present application or in the prior art, drawings needed in the embodiments or the description of the prior art will be briefly introduced as follows. Obviously, the drawings in the following description are only some of the embodiments of the present application. For those of ordinary skill in the art, other drawings can be obtained based on these drawings without paying any creative effort.

DETAILED DESCRIPTION

In order to make the objectives, technical solutions and advantages of the embodiments of the present application clearer, the technical solutions in the embodiments of the present application will be described clearly and completely in conjunction with the accompanying drawings in the embodiments of the present application. Obviously, the embodiments described are part of the embodiments of the present application, rather than all of the embodiments. Based on the embodiments in the present application, all other embodiments obtained by those of ordinary skill in the art without creative effort shall fall within the protection scope of the present application.

Before introducing the method according to the present embodiment, the blockchain is introduced as follows: blockchain technology is the convergence of P2P network, distributed system, encryption technology and database technology. In a narrow sense, blockchain technology is a chain structure in which data blocks are chronologically assembled in a sequentially connected manner into a distributed ledger that is difficult to tamper and falsify, guaranteed by cryptography. In a broad sense, blockchain technology is a novel distributed infrastructure and computing paradigm that uses blockchain data structures to verify and store data, uses distributed node consensus algorithms to generate and update data, uses cryptography to ensure the security of data transmission and access, and uses smart contracts composed of automated script codes to program and operate data.

Based on the sources of network nodes, the current mainstream blockchains are roughly divided into three types. Public blockchains are widely used in the current blockchain system, in which anyone can participate in and maintain their own nodes. Each user can send transactions, view historical data, assist in verifying information, compete for packing blocks, etc. Besides, nodes can add or withdraw at will, with equal rights over time. Therefore, the public blockchains represent a concept of "complete decentralization" with few restrictions on nodes. Since the information on the public blockchain can be viewed by anyone, in some scenarios that may involve industry secrets, such as banking, securities, insurance, business cooperation, etc., consortium blockchains are often a better choice. In contrast to public blockchains, consortium blockchains have access restrictions for nodes and can only be added by specific groups or organizations. Thus, consortium blockchains are actually "partially decentralized" or "multi-centralized." Although this goes against the original intention of the blockchain to some extent, in view of the inherent "central" concept of human beings, applications based on the consortium blockchains will gradually increase. Private blockchains are stricter than consortium chains in terms of node restrictions, and can often only be added and maintained by personnel from the enterprise headquarters. Private blockchains are usually used in scenarios where the degree of information confidentiality is high (such as the military), or for internal use only. At this time, the "decentralization" idea of blockchain technology is no longer obvious, the main reason is to use the blockchain as a database with the help of its features such as multi-point backup and traceability of information.

Figure 1:
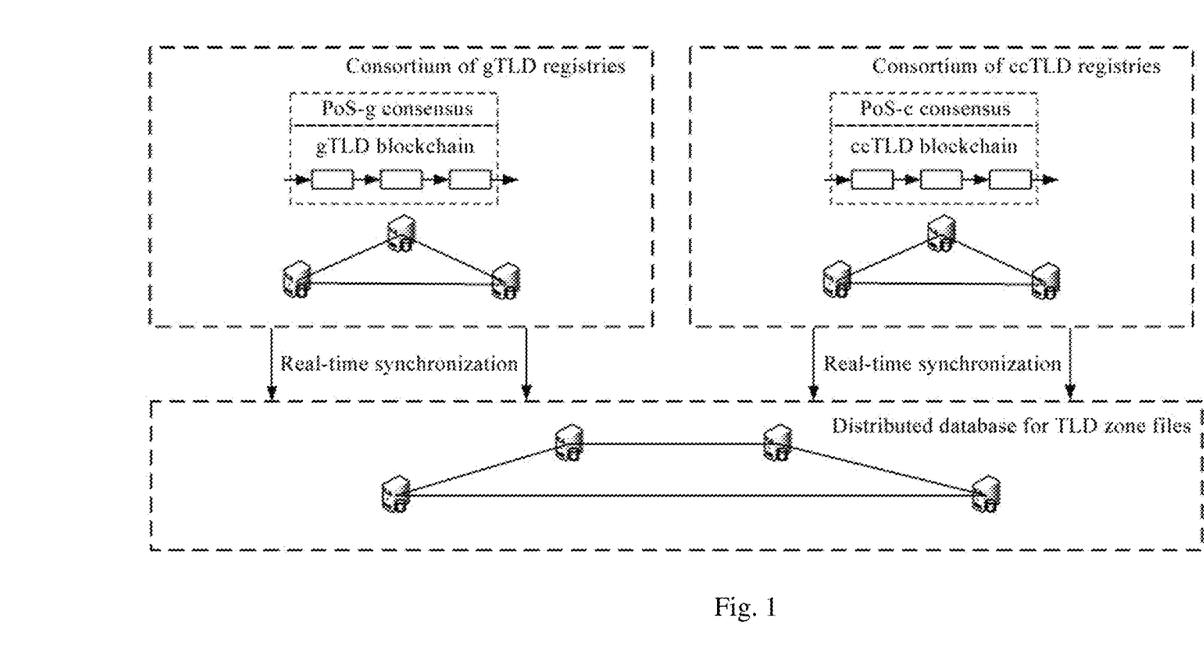
FIG. 1 is a schematic structural diagram of a blockchain hybrid consensus-based system for maintaining domain name information according to an embodiment of the present application.

FIG. 1 is a schematic structural diagram of a blockchain hybrid consensus-based system for maintaining domain name information according to this embodiment. As shown in FIG. 1, the system includes: a gTLD blockchain, formed by first network nodes where international generic top-level domain registries are located; and a ccTLD blockchain, formed by second network nodes where country code top-level domain registries are located;

collecting, by a speaker node in consensus nodes of the gTLD blockchain, domain name operation information from each first network node, packing the collected domain name operation information to generate first block information, broadcasting the first block information to member nodes in the consensus nodes, and receiving verification results of various member nodes on the first block information; and sending the first block information to each first network node to execute the domain name operation information in the first block information at each first network node when the number of nodes by which the verification of the first block information passes among the consensus nodes is greater than a first preset threshold;

collecting, by a rotation node which currently takes turn in the ccTLD blockchain, domain name operation information from each second network node, packing the collected domain name operation information to generate second block information, broadcasting the second block information to each second network node, and receiving verification results of various second network nodes on the second block information; and sending the second block information to each second network node to execute the domain name operation information in the second block information at each second network node when the number of nodes by which the verification of the second block information passes is greater than a second preset threshold;

wherein, the consensus node is the first network node that participates in the consensus process of verifying the block information in the gTLD blockchain, and the consensus node includes the speaker node and the member nodes.

As shown in FIG. 1, for the network nodes where the top-level domain registries that maintain top-level domain information are located, the blockchain composed of the network nodes where the top-level domain registries for maintaining international generic domain names are located is used as the gTLD blockchain, and the blockchain composed of the network nodes where the top-level domain registries for maintaining country code domain names are located is used as the ccTLD blockchain. In both the gTLD blockchain and the ccTLD blockchain, the domain name operation information is verified through each network node in the blockchain to realize the maintenance of the domain name information, avoiding the low security and poor stability of centralized maintenance methods. Based on the geographical and policy differences between generic top-level domain names and country code top-level domain names, separate maintenance of these two types of domain information can better take account of these differences and domain information is effectively maintained. Wherein, the domain name operation information includes information for operations such as adding, deleting, modifying, and checking the domain name, which is not specifically defined in this embodiment. Registries for international generic top-level domains are, for example, .com registries; and registries for country code top-level domains are, for example, .cn registries, .org registries, .us registries, and .uk registries.

In the gTLD blockchain, the consensus process is carried out by elected consensus nodes (for example, using the PoS-g consensus mechanism) to verify domain name operation information. The speaker node is selected from the consensus nodes and used as the block producer in the consensus process. The first preset threshold is ½ or ⅔ of the total number of consensus nodes in the gTLD blockchain.

In the ccTLD blockchain, all second network nodes participate in the consensus process (for example, using the PoS-c consensus mechanism) to verify domain name operation information. The second network nodes in the ccTLD blockchain take turns as the block producer in the consensus process. The second preset threshold is ½ or ⅔ of the total number of second network nodes in the ccTLD blockchain.

Provided in this embodiment is a blockchain hybrid consensus-based system for maintaining domain name information. A gTLD blockchain is formed by first network nodes where international generic top-level domain registries are located, and a ccTLD blockchain is formed by second network nodes where various country codes top-level domain registries are located. The domain name information of the international generic top-level domain names is maintained by the gTLD blockchain, and the domain name information of various country code top-level domain names is maintained by the ccTLD blockchain. The domain information of all top-level domain names is maintained by the two blockchains in parallel. In each blockchain, various network nodes of the blockchain participate in the domain name information update process, so that the domain name information update process will not be affected by a mistake or an attack on one network node. Compared to centralized maintenance methods, this decentralized maintenance method is more secure and is beneficial to maintaining the stability of the system. International generic domain name information maintenance and country code domain name information maintenance are performed separately, and thus differences in information maintenance between local domain names and generic domain names are adapted and the efficiency of information maintenance is improved. In addition, domain name information is prevented from being maliciously tampered by means of blockchain technology, and a reliable data source is provided for update of domain names.

In an embodiment, on the basis of the foregoing embodiment, the system further includes:
after executing the domain name operation information in the first block information at each first network node, sending, by the gTLD blockchain, the first block information to any second network node of the ccTLD blockchain; and synchronizing, by the second network node that receives the first block information, the domain name operation information in the first block information to each second network node of the ccTLD blockchain;
after executing the domain name operation information in the second block information at each second network node, sending, by the ccTLD blockchain, the second block information to any first network node of the gTLD blockchain; and synchronizing, by the first network node that receives the second block information, the domain name operation information in the second block information to each first network node of the gTLD blockchain.

As shown in FIG. 1, whether the first network nodes in the gTLD blockchain execute the domain name operation information in the first block information, or the second network nodes in the ccTLD blockchain execute the domain name operation information in the second block information, the domain name operation information is synchronized in all network nodes of the two blockchains through information interaction between the nodes of the two blockchains, so as to ensure that each network node can provide consistent domain name information to the user. In other words, each domain name operation information will be synchronized in the domain name information database of each network node of the two blockchains.

The present embodiment provides a blockchain hybrid consensus-based system for maintaining domain name information. The domain name operation information executed each time will be synchronized in the domain name information database of each network node of the two blockchains, so as to ensure that each network node can provide consistent and reliable domain name information.

Specifically, as shown in FIG. 1, the system provided in this embodiment is divided into a consortium blockchain layer and a zone file layer in terms of logical architecture, where the consortium blockchain layer is divided into a gTLD consortium blockchain and a ccTLD consortium blockchain. The roles of nodes on the gTLD consortium blockchain are divided into two categories, generating nodes (or consensus nodes) and normal nodes, and the generating nodes are divided into speaker and members. The generating node participates in the consensus process, in which the speaker is responsible for generating blocks and broadcasting them to all members to confirm the blocks. Normal nodes do not participate in the consensus process, but every normal node can campaign for a generating node. The nodes in the consortium blockchain are served by various top-level domain registries, and each registry has a certain limit on the number of nodes participating in a consensus term. All nodes on the chain have consistent TLD blockchain information. Taking advantage of the fact that the information on the blockchain is difficult to be tampered, the operation behavior record of the domain name is stored in the block, packaged on the chain, and the status information of the zone file system is maintained. Nodes on the chain synchronize the authoritative record of the domain name operation behavior to the TLD zone file database in real time, to provide a reliable source of trust for the zone file system.

In an embodiment, on the basis of the foregoing embodiments, the system further includes:
every time after each first network node executes the domain name operation information in the first block information or when it is detected that the speaker node is not able to produce blocks, determining the consensus nodes for participating in the consensus process from the first network nodes of the gTLD blockchain according to a preset election mechanism, determining a unique node from the consensus nodes as the speaker node by means of a preset algorithm, and collecting, by the speaker node, the domain name operation information from each first network node.

When the domain name operation information in the first block information is executed or the speaker node is not able to produce blocks, the current round of cyclic process ends and the election of consensus nodes is restarted for the next round of consensus process. Such consensus process is continuously circulated so as to ensure the timely update of domain name operation information and maintain the validity of domain name information.

In an embodiment, on the basis of the foregoing embodiments, the determining the consensus nodes for participating in the consensus process from the first network nodes of the gTLD blockchain according to a preset election mechanism, determining a unique node from the consensus nodes as the speaker node by means of a preset algorithm includes:

calculating election scores based on the number of tokens held and the holding time of tokens by each first network node, and according to the descending order of the election scores, taking the first network nodes ranked above a preset ranking as the elected consensus nodes for participating in the consensus process; and selecting randomly a node from the consensus nodes, or determining a unique node based on the block height and the number of consensus nodes of the current gTLD blockchain, as the speaker node.

Each time a network node participates in the consensus process, or as the length of time it exists in the gTLD blockchain increases, the number of tokens it owns increases. For each first network node, the score obtained by multiplying the number of tokens owned by the network node by it holding time of the tokens may be used as the election score, and the first network nodes ranked Top K in terms of the election score are selected as consensus nodes.

When the speaker node is selected from the consensus nodes, every effort must be made to ensure that each consensus node has the same probability of being selected as the speaker node. For example, the speaker node is selected by random selection, or the speaker node is selected by MOD calculation. Herein is a method of selecting the speaker node through MOD calculation as follows: calculating the block height of the current block and the total number of the consensus nodes, and dividing the two to obtain the remainder, among the top K consensus nodes, the node whose serial number is equal to the remainder is the speaker node.

Figure 2:
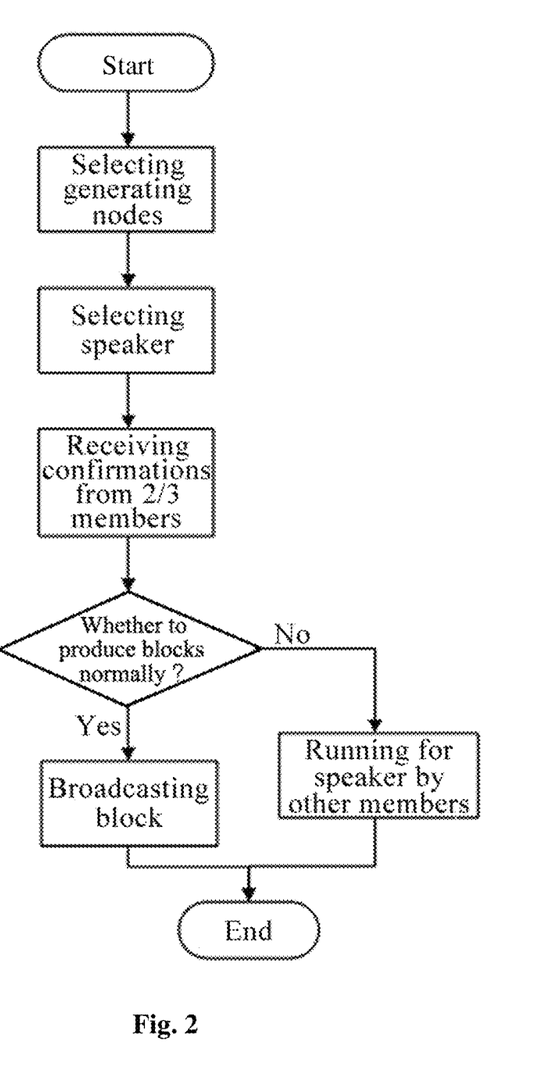
FIG. 2 is a schematic flowchart of a gTLD consensus process according to another embodiment of the present application.

In order to further specify the PoS-g consensus mechanism, FIG. 2 is a schematic flowchart of a gTLD consensus process according to this embodiment. As shown in FIG. 2, the consensus process of the PoS-g consensus mechanism includes: (1) selecting generating nodes: economic incentives is introduced to encourage nodes to participate in voting; a concept similar to token age is introduced, that is, according to the number of tokens held×the holding time of the tokens: the more you participate, the more you earn, and the more you participate, the easier it will be to participate; and the TopK nodes will be selected as the generating nodes; (2) selecting speaker: the speaker node is selected from the generating nodes selected in the step (1), and MOD operation is performed on the current block height and the number of generating nodes, which in fact makes the probability of election equal; other nodes are member nodes; (3) confirming right: after the speaker is elected, the speaker broadcasts the request before producing blocks; after receiving the request, the members sign and send confirmation responses upon verification; the speaker receives the confirmation responses from the members, and prepares to produce blocks if confirmations from ⅔ members are received; and (4) producing blocks: the speaker collects and packages the record information in the system, packs it into blocks, broadcasts it to the member nodes, and enters an irreversible state, and the next round of election of generating nodes is restarted.

In the consensus process PoS-c in the ccTLD blockchain, since each node in the ccTLD chain represents the authority of each country code, it is responsible for participating in the process of maintaining the top-level domain of that country code. Therefore, each ccTLD registry node takes turns to keep accounts, registers and updates related domain names in accordance with the laws and regulations of each top-level domain, and writes the domain name operation records of the ccTLD for a period of time into the blockchain, and other nodes only need to verify at the blockchain level and update and maintain the domain name operation records in the block.

The nodes in the two chains maintain consistent domain name status information. The zone file database synchronizes the records in the two consortium blockchains in real time, maintains zone files information according to the domain name operation, updates the zone files of each top-level domain in real time, and provides analysis function for application layer.

In an embodiment, on the basis of the foregoing embodiments, the system further includes:

after any first network node of the gTLD blockchain receives the information of adding a first newly added node to the gTLD blockchain, broadcasting the first newly added node to each first network node of the gTLD blockchain, receiving voting result sent by each first network node on whether to add the first newly added node to the gTLD blockchain, and adding the first newly added node to a node list of the gTLD blockchain by each first network node when the number of nodes agreeing to add the first newly added node to the gTLD blockchain exceeds a third preset threshold in the voting result.

In an embodiment, on the basis of the foregoing embodiments, the system further includes:

after any second network node of the ccTLD blockchain receives the information of adding a second newly added node to the ccTLD blockchain, broadcasting the second newly added node to each second network node of the ccTLD blockchain, receiving voting result sent by each second network node on whether to add the second newly added node to the ccTLD blockchain, and adding the second newly added node to a node list of the ccTLD blockchain by each second network node when the number of nodes agreeing to add the second newly added node to the ccTLD blockchain exceeds a fourth preset threshold in the voting result.

The third preset threshold is ½ or ⅔ of the total number of first network nodes of the gTLD blockchain. In other words, if more than half or two-thirds of the first network nodes vote for the first newly added node to be added to the gTLD blockchain, the first newly added node is added to the gTLD blockchain.

The fourth preset threshold is ½ or ⅔ of the total number of second network nodes of the ccTLD blockchain. In other words, if more than half or two-thirds of the second network nodes vote for the second newly added node to be added to the ccTLD blockchain, the second newly added node is added to the ccTLD blockchain.

Provided in this embodiment is a blockchain hybrid consensus-based system for maintaining domain name information, in which the addition of network nodes in the gTLD blockchain and the ccTLD blockchain needs to be determined by the network nodes in each blockchain by means of voting, thereby completely guaranteeing the security of adding nodes.

In an embodiment, on the basis of the foregoing embodiments, the system further includes:

after any first network node of the gTLD blockchain receives a complaint against a first trouble node existing in the gTLD blockchain, broadcasting the first trouble node to each first network node of the gTLD blockchain, receiving voting result sent by each first network node on whether to remove the first trouble node from the gTLD blockchain, and deleting the first trouble node from a node list of the gTLD blockchain by each first network node when the number of nodes agreeing to remove the first trouble node from the gTLD blockchain exceeds a fifth preset threshold in the voting result.

In an embodiment, on the basis of the foregoing embodiments, the system further includes:

after any second network node of the ccTLD blockchain receives a complaint against a second trouble node existing in the ccTLD blockchain, broadcasting the second trouble node to each second network node of the ccTLD blockchain, receiving voting result sent by each second network node on whether to remove the second trouble node from the ccTLD blockchain, and deleting the second trouble node from a node list of the ccTLD blockchain by each second network node when the number of nodes agreeing to remove the second trouble node from the ccTLD blockchain exceeds a sixth preset threshold in the voting result.

The fifth preset threshold is ½ or ⅔ of the total number of first network nodes of the gTLD blockchain. In other words, the first trouble node is removed from the gTLD blockchain when more than half or two-thirds of the first network nodes vote for the first trouble node to be removed from the gTLD blockchain.

The sixth preset threshold is ½ or ⅔ of the total number of second network nodes of the ccTLD blockchain. In other words, the second trouble node is removed from the ccTLD blockchain when more than half or two-thirds of the second network nodes vote for the second trouble node to be removed from the ccTLD blockchain.

Provided in this embodiment is a blockchain hybrid consensus-based system for maintaining domain name information, in which the removal of trouble nodes in the gTLD blockchain and the ccTLD blockchain needs to be determined by the network nodes in each blockchain by means of voting, thereby avoiding misjudgment or false removal of trouble nodes.

In an embodiment, on the basis of the foregoing embodiments, the system further includes:

after receiving the first block information, verifying, by the member nodes in the gTLD blockchain, the signature, block header, and block content of the first block information, respectively; if the signature, block header, and block content of the first block information are all successfully verified, the verification result of the first block information is successful verification, otherwise, the verification result of the first block information is verification failure.

In an embodiment, on the basis of the foregoing embodiments, the system further includes:

after receiving the second block information, verifying, by the second network nodes in the ccTLD blockchain, the signature, block header, and block content of the second block information, respectively; if the signature, block header, and block content of the second block information are all successfully verified, the verification result of the second block information is successful verification, otherwise, the verification result of the second block information is verification failure.

Figure 3:
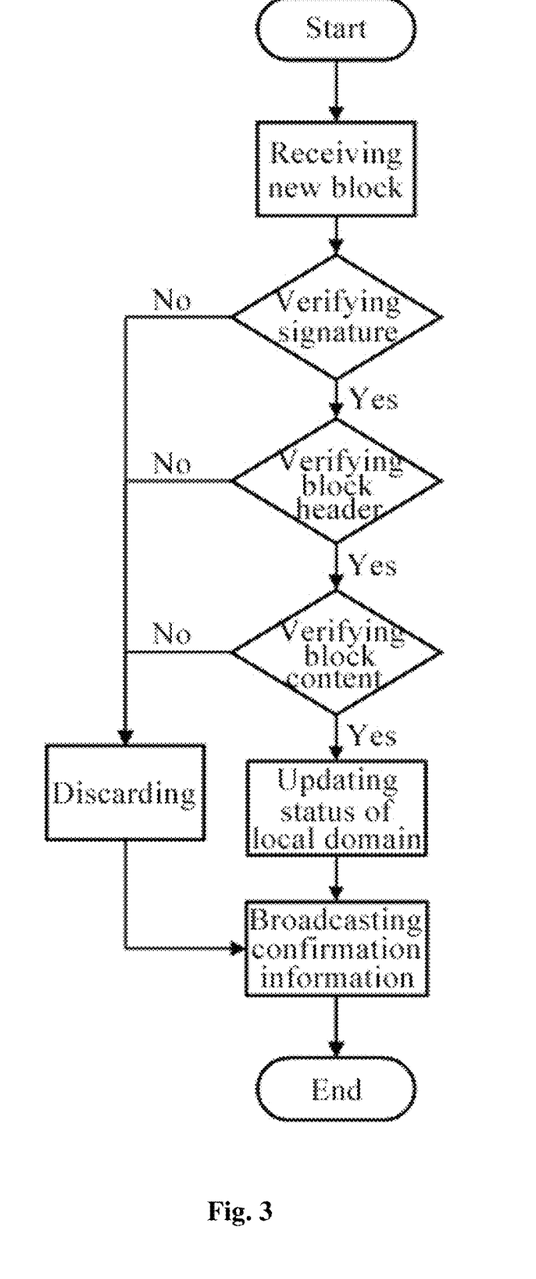
FIG. 3 is a schematic flowchart of verification of a block according to another embodiment of the present application.

FIG. 3 is a schematic flowchart of verification of a block according to this embodiment. In the process of verifying the block information, the signature, block header, and block content need to be verified one by one. Only when all of them pass the verification will the block information be verified.

Specifically, the block header data in the two blockchains are different in structure, referring to Table 1 and Table 2. Table 1 is a block header data structure of the gTLD blockchain, and Table 2 is a block header data structure of the ccTLD blockchain. According to Table 1 and Table 2, the difference between the block headers of the two chains is that in the gTLD are packing nodes, while in the ccTLD are recording nodes. This is because the nodes will compete for packing and producing blocks based on the regular PoS consensus in the domain name operations on the gTLD chain, while the record on-chain in the ccTLD chain does not require a regular voting mechanism, each node only needs to upload the domain name operation record of the domain to the blockchain through the preset accounting rights, relevant business-level verification does not need to be performed by other nodes and only blockchain-level validation of reasonableness is needed.

TABLE 1 block header data structure of the gTLD blockchain

| Field name | Field length | Description |
| --- | --- | --- |
| Version number | 4 bytes | Used to distinguish block versions |
| Previous block hash | 32 bytes | Hash value of the previous block |
| Packing node | 32 bytes | ID of node responsible for producing blocks |
| Recorded Merkle root | 32 bytes | Merkle tree root value recorded by domain name operation |
| Stored Merkle root | 32 bytes | Merkle tree root value stored by domain name operation |
| Timestamp | 4 bytes | Standard time for the block to be verified |
| Node operation instruction | 1 byte | add/exit information of nodes in the chain |

TABLE 2 block header data structure of the ccTLD blockchain

| Field name | Field length | Description |
| --- | --- | --- |
| Version number | 4 bytes | Used to distinguish block versions |
| Previous block hash | 32 bytes | Hash value of the previous block |
| Recording node | 32 bytes | ID of node submitting record |
| Recorded Merkle root | 32 bytes | Merkle tree root value recorded by domain name operation |
| Stored Merkle root | 32 bytes | Merkle tree root value stored by domain name operation |
| Timestamp | 4 bytes | Standard time for the block to be verified |
| Node operation instruction | 1 byte | add/exit information of nodes in the chain |

The block body structure of the two blockchains is relatively simple, consisting of multiple domain name operation records that occurred in the system within a period of time. The data structure of each domain name record is shown in Table 3.

TABLE 3

Data structure of domain name record

| Field name | Field length | Description |
|---|---|---|
| Record attributes | 4 bytes | Root domain or top-level domain |
| Domain name operation type | 4 bytes | Register/update/delete etc. |
| Modified content | 256 bytes | New content |
| Postscript | 128 bytes | Extra information |
| Operator public key | 128 bytes | Issue the signature of modified recording node |
| Timestamp | 4 bytes | Standard time when the record is issued |

In summary, the blockchain hybrid consensus-based system for maintaining domain name information according to these embodiments breaks the traditional hierarchical domain name architecture, and employs the consortium blockchain to record domain name operations. All TLD registries on the chain jointly participate in the management of domain names through voting, and there is no centralized node with privileges. Two chains and different consensus mechanisms are used to avoid the impact of potential local policy or legal differences in the ccTLD blockchain on domain name maintenance. Only the operation of the domain name is recorded into the chain, avoiding the storage and performance problems of chaining all domain name information, and providing a reliable source for resolution services at the same time. Appropriate economic incentives are added to the consensus mechanism to encourage all registry nodes to participate in the consensus process, thereby maintaining the robustness and stability of the system.

Finally, it should be noted that the embodiments above are only for illustrating the technical solutions of the present application, rather than limiting them; although the present application has been described in detail with reference to the foregoing embodiments, those skilled in the art should understand that the technical solutions documented in the preceding embodiments may still be modified, or parts or all of the technical features thereof can be equivalently substituted; and such modifications or substitutions do not deviate from scope of the technical solutions of the embodiments of the present application.

The invention claimed is:

1. A blockchain hybrid consensus-based system for maintaining domain name information, comprising:
a generic top-level domain (gTLD) blockchain, formed by first network nodes where international generic top-level domain registries are located; and a country code top-level domain (ccTLD) blockchain, formed by second network nodes where country code top-level domain registries are located;
wherein the blockchain hybrid consensus-based system comprises a computing device configured to:
collect, by a speaker node in consensus nodes of the gTLD blockchain, domain name operation information from each first network node, pack collected domain name operation information to generate first block information, broadcast the first block information to member nodes in the consensus nodes, receive verification result of each member node on the first block information, and send the first block information to each first network node to execute the domain name operation information in the first block information at each first network node in response to determining that a number of nodes by which the verification of the first block information passes in the consensus node is greater than a first preset threshold; and
collect, by a rotation node which currently takes turn in the ccTLD blockchain, domain name operation information from each second network node, pack collected domain name operation information to generate second block information, broadcast the second block information to each second network node, receive verification result of each second network node on the second block information, and send the second block information to each second network node to execute the domain name operation information in the second block information at each second network node in response to determining that the number of nodes by which the verification of the second block information passes is greater than a second preset threshold;
wherein the consensus node is the first network node that participates in the consensus process of verifying block information in the gTLD blockchain, and the consensus node includes the speaker node and the member nodes;
the blockchain hybrid consensus-based system is further configured to:
every time after each first network node executes the domain name operation information in the first block information or in response to detecting that the speaker node is not able to produce blocks, determine the consensus nodes for participating in the consensus process from the first network nodes of the gTLD blockchain according to a preset election mechanism, determine a unique node from the consensus nodes as the speaker node by a preset algorithm, and collect, by the speaker node, the domain name operation information from each first network node;
the determining the consensus nodes for participating in the consensus process from the first network nodes of the gTLD blockchain according to a preset election mechanism, determining a unique node from the consensus nodes as the speaker node by a preset algorithm comprising:
calculating election scores based on a number of tokens held and a holding time of tokens by each first network node, and according to a descending order of the election scores, taking the first network nodes ranked above a preset ranking as the elected consensus nodes for participating in the consensus process; and
selecting randomly a node from the consensus nodes, or determining a unique node based on a block height and a number of consensus nodes of the current gTLD blockchain, as the speaker node.

2. The system of claim 1, wherein the blockchain hybrid consensus-based system is further configured to:
after each first network node executes the domain name operation information in the first block information, send, by the gTLD blockchain, the first block information to any second network node of the ccTLD blockchain; and synchronize, by the second network node that receives the first block information, the domain name operation information in the first block information to each second network node of the ccTLD blockchain;
after each second network node executes the domain name operation information in the second block information, send, by the ccTLD blockchain, the second block information to any first network node of the gTLD blockchain; and synchronize, by the first network node that receives the second block information, the domain name operation information in the second block information to each first network node of the gTLD blockchain.

3. The system of claim 1, wherein the blockchain hybrid consensus-based system is further configured to:

after any first network node of the gTLD blockchain receives information of adding a first newly added node to the gTLD blockchain, broadcast the first newly added node to each first network node of the gTLD blockchain, receive voting result sent by each first network node on whether to add the first newly added node to the gTLD blockchain, and add the first newly added node to a node list of the gTLD blockchain by each first network node in response to determining that the number of nodes agreeing to add the first newly added node to the gTLD blockchain exceeds a third preset threshold in the voting result.

4. The system of claim 1, wherein the blockchain hybrid consensus-based system is further configured to:

after any second network node of the ccTLD blockchain receives information of adding a second newly added node to the ccTLD blockchain, broadcast the second newly added node to each second network node of the ccTLD blockchain, receive a voting result sent by each second network node on whether to add the second newly added node to the ccTLD blockchain, and add the second newly added node to a node list of the ccTLD blockchain by each second network node in response to determining that the number of nodes agreeing to add the second newly added node to the ccTLD blockchain exceeds a fourth preset threshold in the voting result.

5. The system of claim 1, wherein the blockchain hybrid consensus-based system is further configured to:

after any first network node of the gTLD blockchain receives a complaint against a first trouble node existing in the gTLD blockchain, broadcast the first trouble node to each first network node of the gTLD blockchain, receive voting result sent by each first network node on whether to remove the first trouble node from the gTLD blockchain, and delete the first trouble node from a node list of the gTLD blockchain by each first network node in response to determining that the number of nodes agreeing to remove the first trouble node from the gTLD blockchain exceeds a fifth preset threshold in the voting results.

6. The system of claim 1, wherein the blockchain hybrid consensus-based system is further configured to:

after any second network node of the ccTLD blockchain receives a complaint against a second trouble node in the ccTLD blockchain, broadcast the second trouble node to each second network node of the gTLD blockchain, receive voting result sent by each second network node on whether to remove the second trouble node from the ccTLD blockchain, and delete the second trouble node from a node list of the ccTLD blockchain by each second network node in response to determining that the number of nodes agreeing to remove the second trouble node from the ccTLD blockchain exceeds a sixth preset threshold in the voting results.

7. The system of claim 1, wherein the blockchain hybrid consensus-based system is further configured to:

after receiving the first block information, verify, by the member nodes in the gTLD blockchain, a signature, block header, and block content of the first block information, respectively; in response to determining that the signature, block header, and block content of the first block information are all successfully verified, determine that the verification result of the first block information is successful verification, and in response to determining that the signature, block header, and block content of the first block information are not all successfully verified, determine that the verification result of the first block information is verification failure.

8. The system of claim 1, wherein the blockchain hybrid consensus-based system is further configured to:

after receiving the second block information, verify, by the second network nodes in the ccTLD blockchain, a signature, block header, and block content of the second block information, respectively; in response to determining that the signature, block header, and block content of the second block information are all successfully verified, determine that the verification result of the second block information is successful verification, and in response to determining that the signature, block header, and block content of the second block information are not all successfully verified, determine that the verification result of the second block information is verification failure.

\* \* \* \* \*